(12) United States Patent
Lai et al.

(10) Patent No.: US 8,087,086 B1
(45) Date of Patent: Dec. 27, 2011

(54) METHOD FOR MITIGATING FALSE POSITIVE GENERATION IN ANTIVIRUS SOFTWARE

(75) Inventors: Everett Lai, Alhambra, CA (US); Patrick Gardner, Northridge, CA (US); John Meade, Cypress, CA (US)

(73) Assignee: Symantec Corporation, Mountain View, CA (US)

( * ) Notice: Subject to any disclaimer, the term of this patent is extended or adjusted under 35 U.S.C. 154(b) by 749 days.

(21) Appl. No.: 12/164,771

(22) Filed: Jun. 30, 2008

(51) Int. Cl.
  *G06F 11/00* (2006.01)
  *G06F 12/14* (2006.01)
  *G06F 12/16* (2006.01)
  *G08B 23/00* (2006.01)

(52) U.S. Cl. ......................................................... 726/24
(58) Field of Classification Search ...................... 726/24
See application file for complete search history.

(56) References Cited

U.S. PATENT DOCUMENTS

| 7,152,164 | B1* | 12/2006 | Loukas | 713/188 |
| 2003/0177394 | A1* | 9/2003 | Dozortsev | 713/201 |
| 2005/0071385 | A1* | 3/2005 | Rao | 707/200 |
| 2006/0161761 | A1* | 7/2006 | Schwartz et al. | 711/216 |

* cited by examiner

Primary Examiner — Benjamin Lanier
Assistant Examiner — Cordelia Zecher
(74) Attorney, Agent, or Firm — Wilmer Cutler Pickering Hale and Dorr LLP

(57) ABSTRACT

A method for mitigating false-positives as detected by antivirus software comprising accessing an operating system file that has been identified as malware; creating a signature for the operating system file; comparing the created signature to a signature database; and, if the created signature is not found in the signature database, defining the operating system file as malware. An operating system file, as used herein, is any file included as a part of the operating system binary executable file set, as well as any files added from third party vendors that integrate with or plug into the operating system.

18 Claims, 7 Drawing Sheets

METHOD FOR MITIGATING FALSE POSITIVE GENERATION IN ANTIVIRUS SOFTWARE

BACKGROUND OF THE INVENTION

1. Field of the Invention

Embodiments of the present invention generally relate to virus detection techniques and, more particularly, a method and apparatus for mitigating false-positive generation in antivirus software.

2. Description of the Related Art

As antivirus software distributors and developers continue to innovate their protection technologies to accommodate the growing number of different forms of malicious software (malware) seen on networks today, antivirus technologies are trending to use broader, more generic detection technologies such as generic signatures, behavior detections, and static file heuristics. While these broader detection technologies create better detection for new and unknown malware and malware variance, these technologies increase the potential for false-positives where an antivirus application wrongly identifies a legitimate file as malware. The cost of false-positives to a company using such antivirus techniques is very high. Wrongly removing a software application can in many cases greatly impact the user, leaving them with a system in an unbootable state or without internet access.

Such false-positive mishandling is especially a problem for operating system binaries. If any of the operating system files are wrongly identified as malware, the user system is likely to have severe side effects. The side effects may include having the computer become unusable.

Therefore, there is a need for a method for mitigating false-positives as detected by antivirus software.

SUMMARY OF THE INVENTION

Embodiments of the present invention comprise a method for mitigating false-positives as detected by antivirus software comprising accessing an operating system file that has been identified as malware; creating a signature for the operating system file; comparing the created signature to a signature database; and, if the created signature is not found in the signature database, defining the operating system file as malware. An operating system file, as used herein, is any file included as a part of the operating system binary executable file set, as well as any files added from third party vendors that integrate with or plug into the operating system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention reduce false-positives by determining if a file that generated a malware detection can be verified as a known operating system file.

Figure 1:
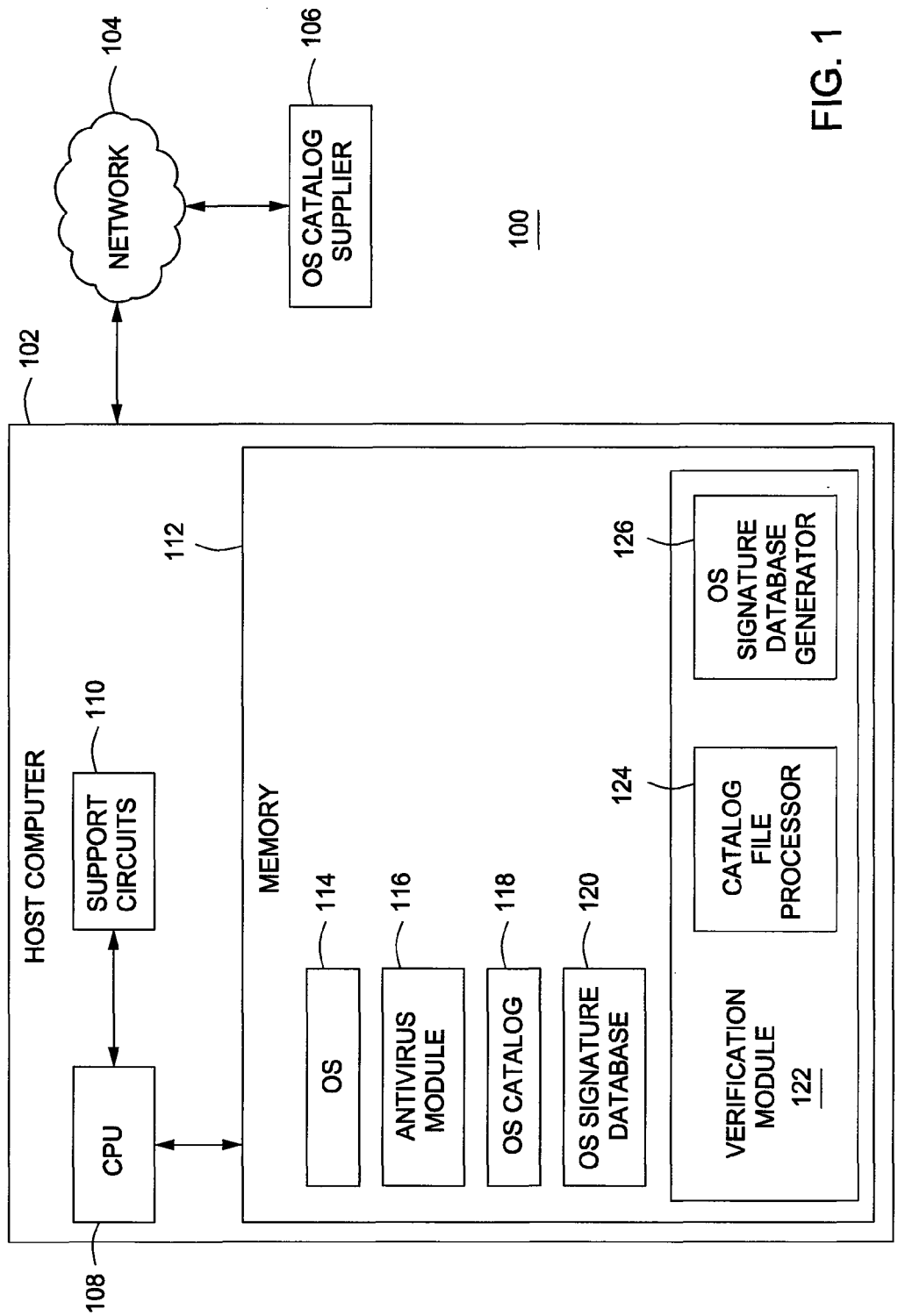
FIG. 1 depicts a block diagram of a computer system utilizing embodiments of the present invention.

FIG. 1 depicts a computer system 100 comprising a host computer 102, a network 104, and an operating system catalog supplier 106. The host computer 102 may be one of many types of computing devices including laptop computers, desktop computers, personal digital assistants, cellular telephones, and the like. Typically, the host computer 102 is any form of computing device that may be under attack by virus developers. The network 104 is any form of communications network carrying digital data between computers. Such networks include wide-area networks, local area networks, wireless networks, and the like.

The operating system catalog supplier 106 is typically the operating system developer that creates a catalog to identify the information within the operating system that it is either providing or updating. The operating system catalog may come with the initial disks and/or download that is provided to the host computer. Thereafter updates created by the operating system developer are downloaded from the operating system catalog supplier 106 through the network to the host computer 102. On these occasions, the operating system developer supplies the operating system catalog updates reflecting the changes made to the operating system. The catalog typically comprises an authentication signature (e.g., Authenticode) to enable the host computer to verify the authenticity of the operating system update.

The host computer 102 comprises a central processing unit (CPU) 108, support circuits 110, and memory 112. The CPU 108 may be one or more of the many commercially available processors, microprocessor or microcontrollers. The support circuits 110 support the functionality of the CPU 108. These well-known support circuits 110 comprise clock circuits, BUS circuits, cache, power supplies, I/O devices, and the like. The memory 112 comprises any form of storage for digital information and software including magnetic memory, semiconductor memory, optical memory, and the like.

The memory 112 stores various software packages including an operating system 114, an antivirus module 116, an operating system catalog 118, an operating system signature database 120, and a verification module 122. In one embodiment of the invention, the verification module 122 comprises two functional modules: a catalog file processor 124 and an operating system signature database generator 126.

The verification module 122 analyzes various attributes of the operating system catalog 118 and compares those attributes to any operating system file that is detected by the antivirus module 116 to be malware. An operating system file, as used herein, is any file included as a part of the operating system binary executable file set, as well as any files added from third party vendors that integrate with or plug into the operating system. Examples of this plugin functionality would be an Internet explorer Browser Helper Object (BHO) plugin from a third part company (third party with respect to the operating system developer. Another example would be a third party device driver from a security company.

The verification module 122 processes a number of signature attributes to analyze the operating system file that has been identified as malware to confirm or deny the malicious nature of the file. The signature attributes are analyzed to determine whether:

Publisher's name correct
Publisher's name is trusted
Signature is correct
Signature is valid
Authenticode validation performed using MD5 or SHA-1
File signature chain is valid The verification module 122 can operate in either kernel mode or user mode. When used in user mode, the verification module 122 is a software module that operates through interaction with the operating system 114. When used in kernel mode, the verification module 122 is a software driver that interacts directly with the hardware. The term "verification module" is used to refer herein to both these embodiments of the invention.

In one specific embodiment, the verification module 122 parses a Microsoft operating system catalog, where the Microsoft operating system catalog uses abstract syntax notation (ASN.1). These catalogs contain hash values corresponding to all Microsoft operating system binaries and related deliverables. The operating system components are generally unique to each host computer. The uniqueness of the catalog depends on many factors including the hardware that is used to support the operating system, the language of the operating system, and many other factors.

The verification module 122 maintains its own database of signature entries that relate to the operating system binaries plus other drivers installed on the host computer by third parties (WHQL certified). One form of signature that is used is the SHA-1 hash. SHA-1 hash contains 20 bytes, and a byte has 256 possible values. As such, there are $256^{20}$ unique keys possible. With such a large number of possible values, the SHA-1 hash is used to build a signature database for a Microsoft operating system as well as any expected updates during the lifetime of that operating system. Other hash techniques, such as MD5, could also be used.

To provide further security, the verification module 122 provides the capability to specify a list of untrusted software publishers that are used in the antivirus module definitions. These are software authors that, while they do have class-3 digital certificates, have developed software that can represent a security risk to users. Therefore, software signed by these software publishers are explicitly untrusted by the verification module 122.

Figure 2:
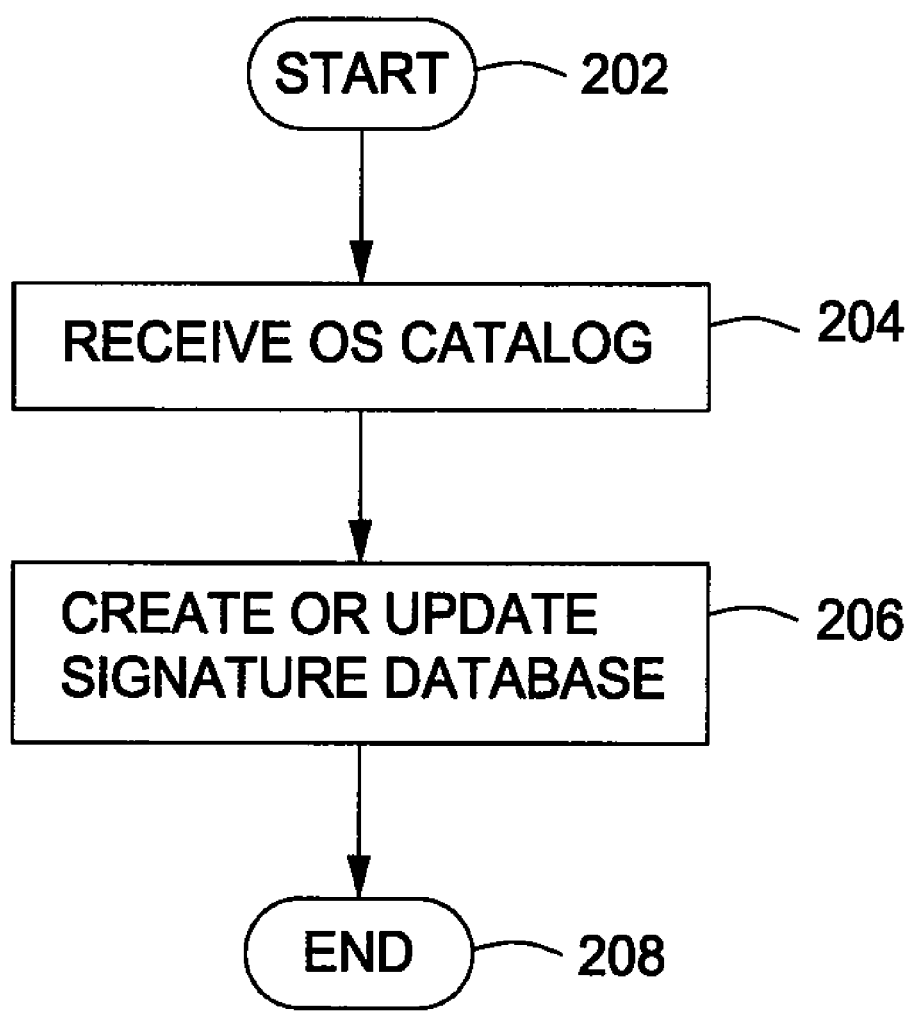
FIG. 2 depicts a flow diagram of a method for creating a signature database in accordance with one embodiment of the invention.

FIG. 2 depicts a flow diagram of a method 200 for generating a signature database. The method 200 begins at step 202 and proceeds to step 204, wherein the verification module receives an catalog representing an operating system or a catalog representing an update for the operating system (hereinafter both types of catalogs are referred to as operating system catalogs). For a Microsoft operating system, the catalog files are identified by a ".cat" file extension. At step 206, the verification module creates or updates the signature database. For example, as discussed in more detail with respect to FIG. 6, a SHA-1 value (a signature) is computed to represent each operating system binary file. The method ends at step 208.

Figure 3:
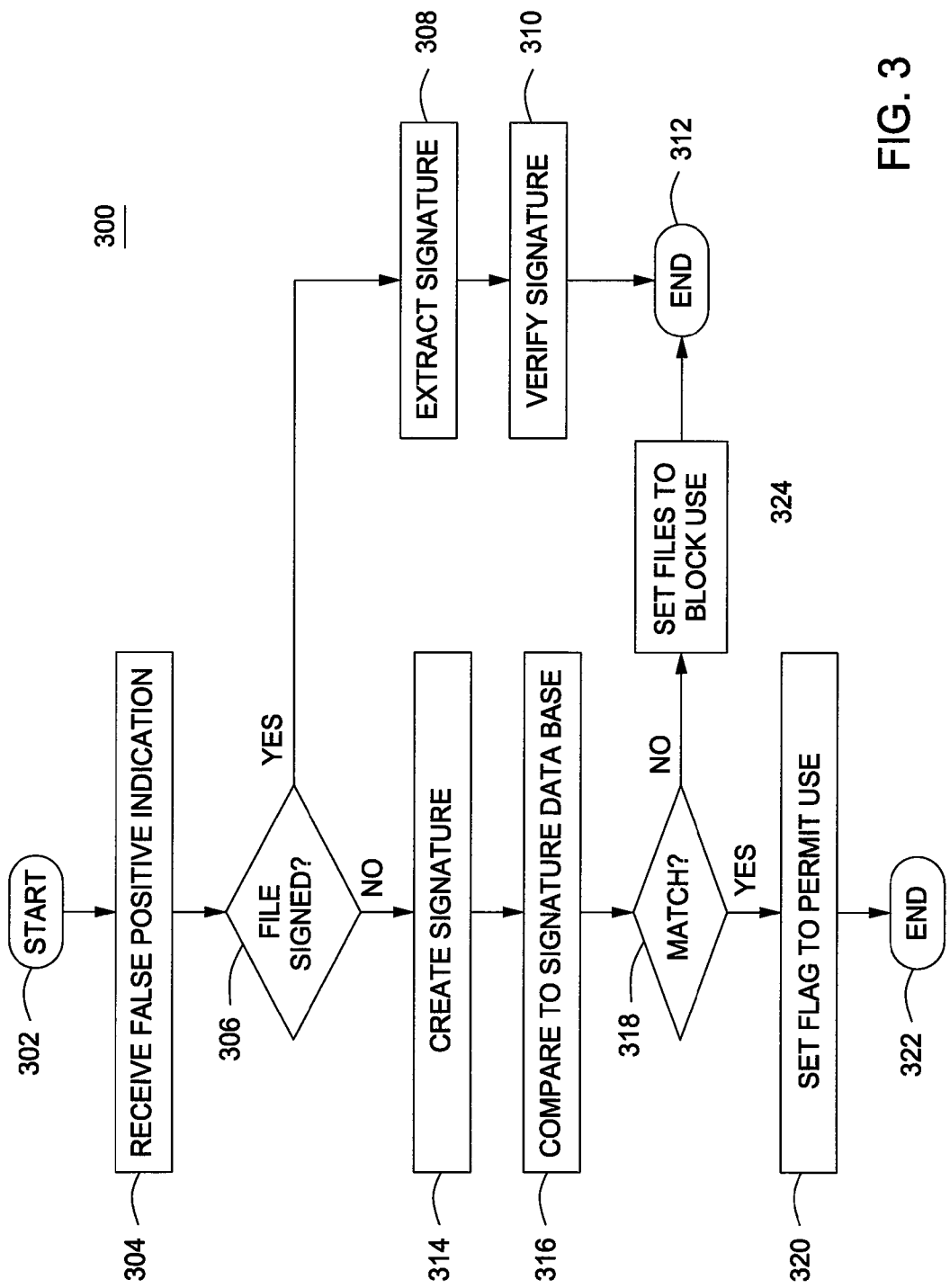
FIG. 3 depicts a flow diagram of a method for handling false-positives as provided by antivirus software in accordance with one embodiment of the present invention.

FIG. 3 depicts a method 300 for processing a file that is identified as containing malware. The method begins at step 302 and proceeds to step 304, wherein the verification module receives a false-positive indication with respect to a file from the antivirus software.

At step 306, the verification module determines whether the file is digitally signed. If the file is signed, the method 300 proceeds to step 308 where the signature is extracted from the signed file. At step 310, the verification module verifies that the signature is trusted (i.e., the signer is not contained on a list of untrusted publishers), and the process ends at step 312. Since the file is identified as having a trusted signature, the file will be used and not blocked by the antivirus software.

If, at step 306, the file is found to not have a signature, the method 300 proceeds to step 314. At step 314, the method creates a signature for the file. For example, a SHA-1 hash is created to represent the file. At step 316, the signature (e.g., SHA-1 hash) is compared to the signature database to identify whether a signature match exists. At step 318, the method 300 queries whether a match has been found. If a match is found, the method 300 proceeds to step 320 where a flag is set to permit use of the file by the host computer. The method ends at step 322.

If, however, at step 318, a match is not found, a flag is set to block use of the file, and the method ends at 312. If the flag is set to block use of the file, the antivirus software ensures that the file is quarantined and not used by the host computer.

Figure 4:
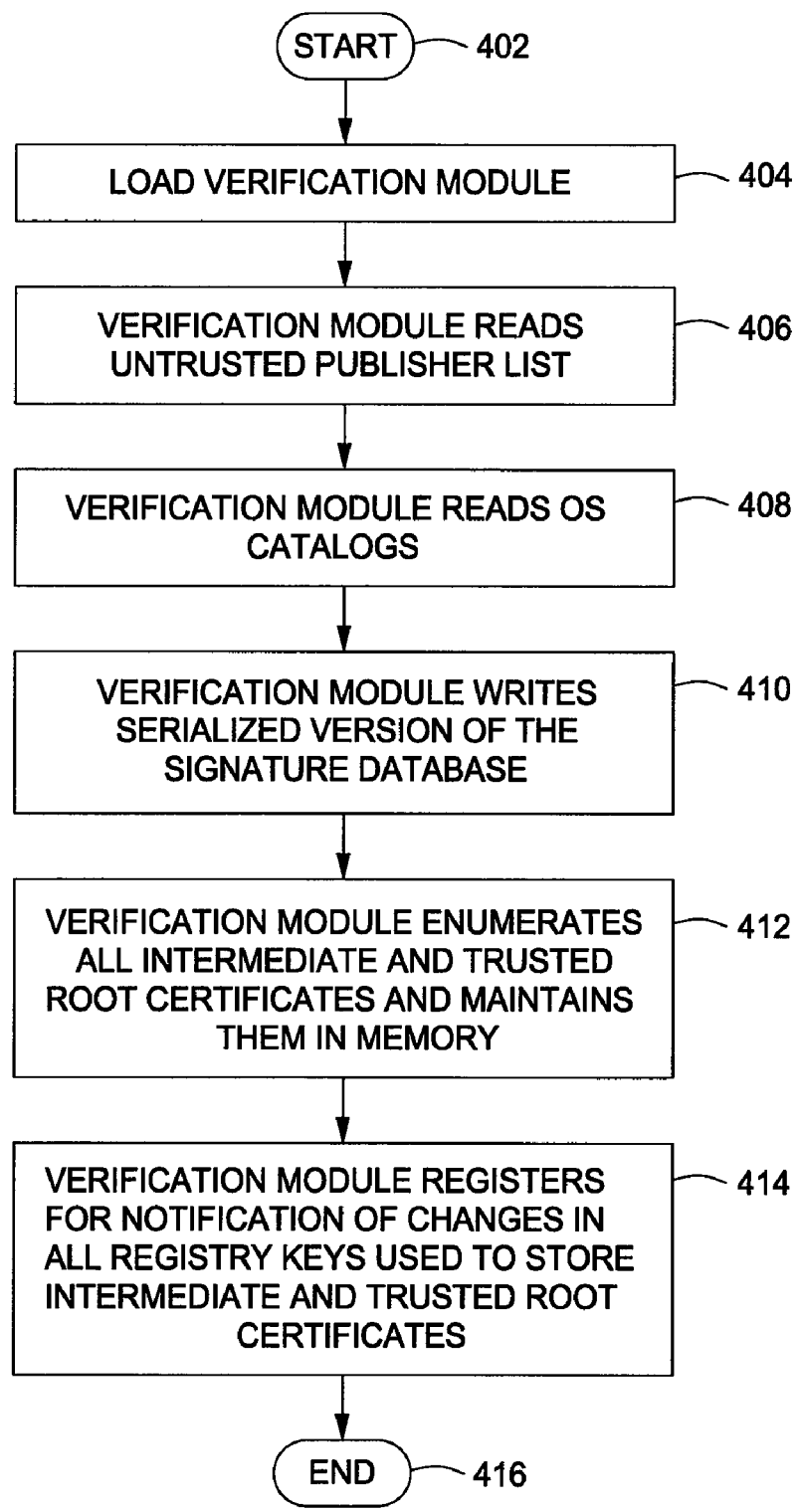
FIG. 4 depicts a detailed flow diagram of a method for instantiating a verification module in accordance with one embodiment of the invention.

FIG. 4 depicts a flow diagram of a method 400 for instantiating the verification module in accordance with one embodiment of the invention. The method 400 begins at step 402 and proceeds to step 404. At step 404, the verification module is loaded. At step 406, the verification module reads the untrusted publisher list and, at step 408, the verification module reads the operating system catalogs. At step 410, the verification module writes a serialized version of the signature database. The signatures in the signature database are, for example, SHA-1 entries. However, other hash values such as MD5 may be used. At step 412, the verification module enumerates all intermediate and trusted root certificates and maintains them in memory. At step 414, the verification module registers for notification of changes in all registry keys used to store intermediate and trusted root certificates. The method 400 ends at step 416.

Figure 5:
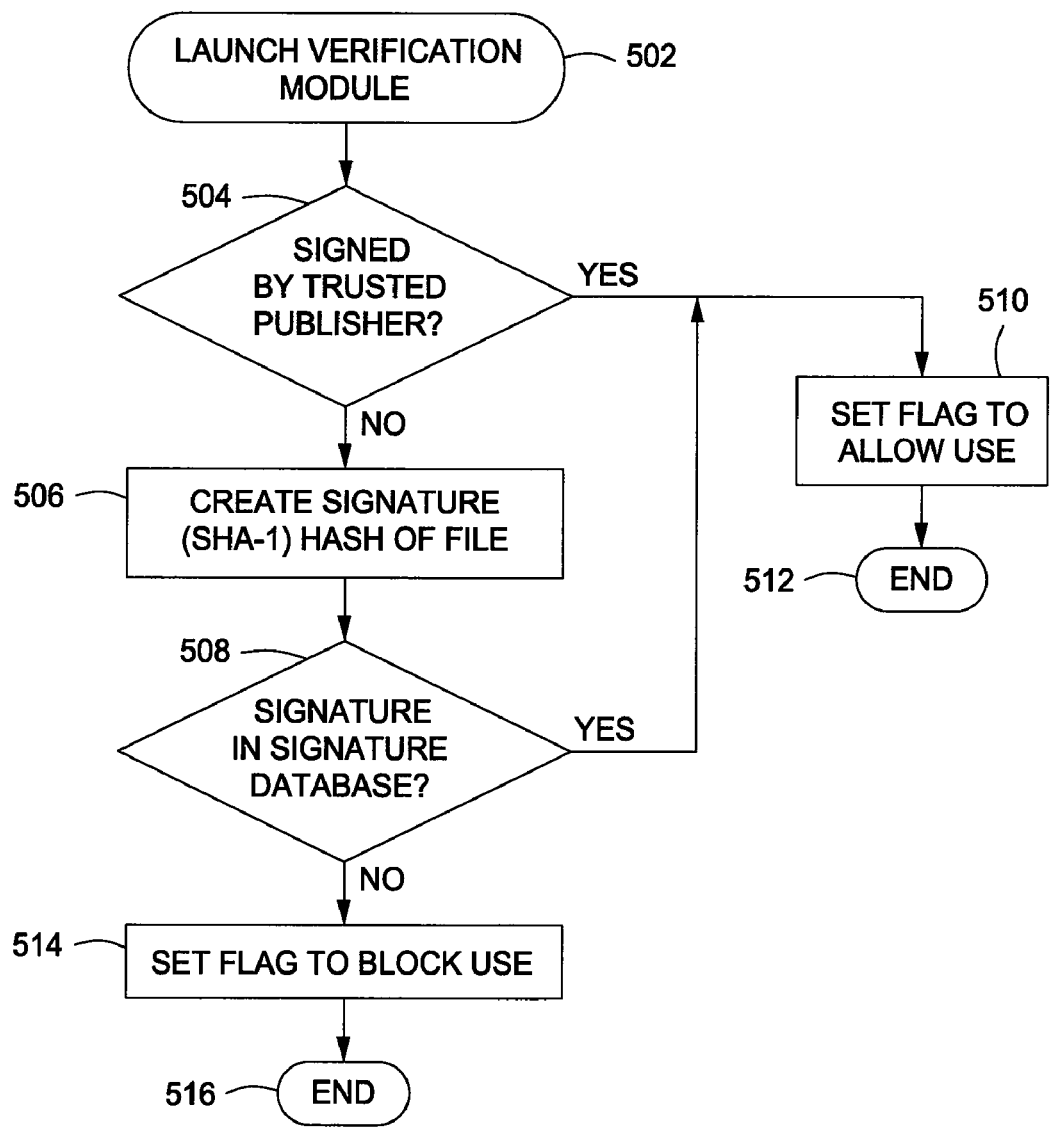
FIG. 5 depicts a detailed flow diagram of a method for processing a file to mitigate false-positives in accordance with one embodiment of the present invention.

FIG. 5 depicts a method 500 for utilizing the verification module to determine whether a file is a false-positive as reported by the antivirus module. The method 500 is launched at step 502 when the antivirus module detects a file that is in the operating system as being malware. The method 500 proceeds to step 504 wherein the method determines whether the file is signed by a trusted publisher. If the signature within the file compares favorably with the trusted publisher list, the method 500 proceeds to step 510 and sets a flag to allow use of the file. The method ends at step 512.

If, at step 504, the file is not signed by a trusted publisher or no publisher is indicated in the signature, the method 500 proceeds to step 506. At step 506, the verification module creates a signature representing the file. Typically, this is an SHA-1 hash of the binary contents of the file that is being processed.

At step 508, the signature that is generated from the file is compared to the signature database. If the signature is found in the signature database, the method 500 proceeds to step 510 where the flag is set to allow use of the file. If, on the other hand, the signature is not found in the signature database, the method 500 proceeds to step 514 wherein the flag is set to block use of the file such that the antivirus software will quarantine the file, i.e., the file is not a false-positive. The method ends at step 516.

Figure 6:
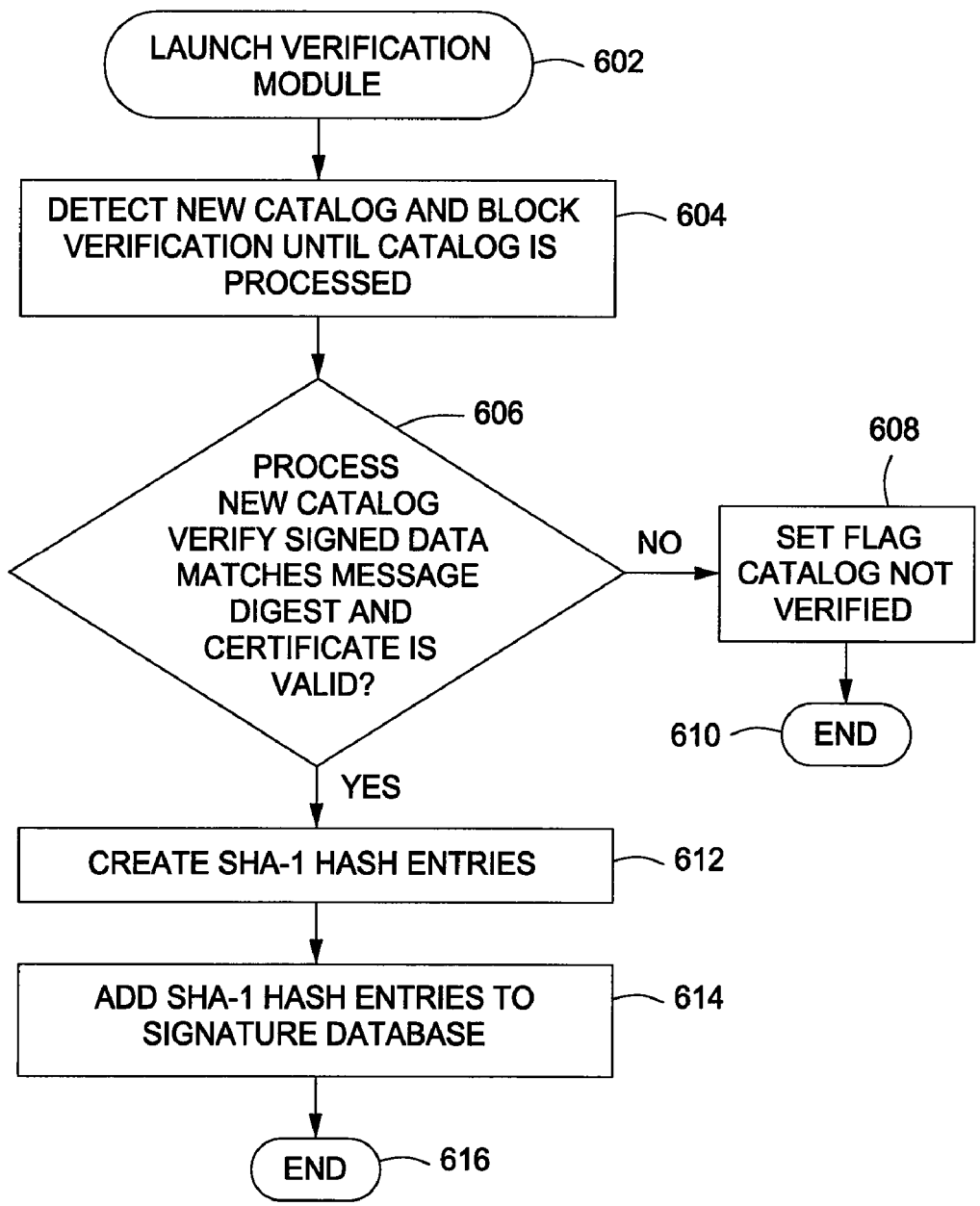
FIG. 6 depicts a detailed flow diagram of a method for generating a signature database using SHA-1 hash entries as the signature within the signature database in accordance with one embodiment of the invention.

FIG. 6 depicts a detailed flow diagram of a method 600 for creating a signature database in accordance with one embodiment of the invention. At step 602, the verification module is launched and proceeds to step 604. At step 604, the verification module detects either a new catalog or an update to a catalog and blocks the verification of any files until the catalog is processed. This blocking function is utilized to ensure that a verification process is not preformed using an outdated catalog. At step 606, the verification module processes the new catalog by verifying the signed data matches a message digest and a proper certificate. If the signed data does not match the message digest and certificate, the method 600 proceeds to step 608 and sets a flag identifying the catalog as not being verified. The method ends at step 610. Upon the catalog not being verified, the antivirus software will notify the user that the operating system has been corrupted.

If at step 606 the catalog is properly signed, the method proceeds to step 612. At step 612, the method creates or reads a SHA-1 hash entry for each file within the catalog. At step 614, the SHA-1 hash entries are added to the signature database, and the method ends at step 616.

Figure 7:
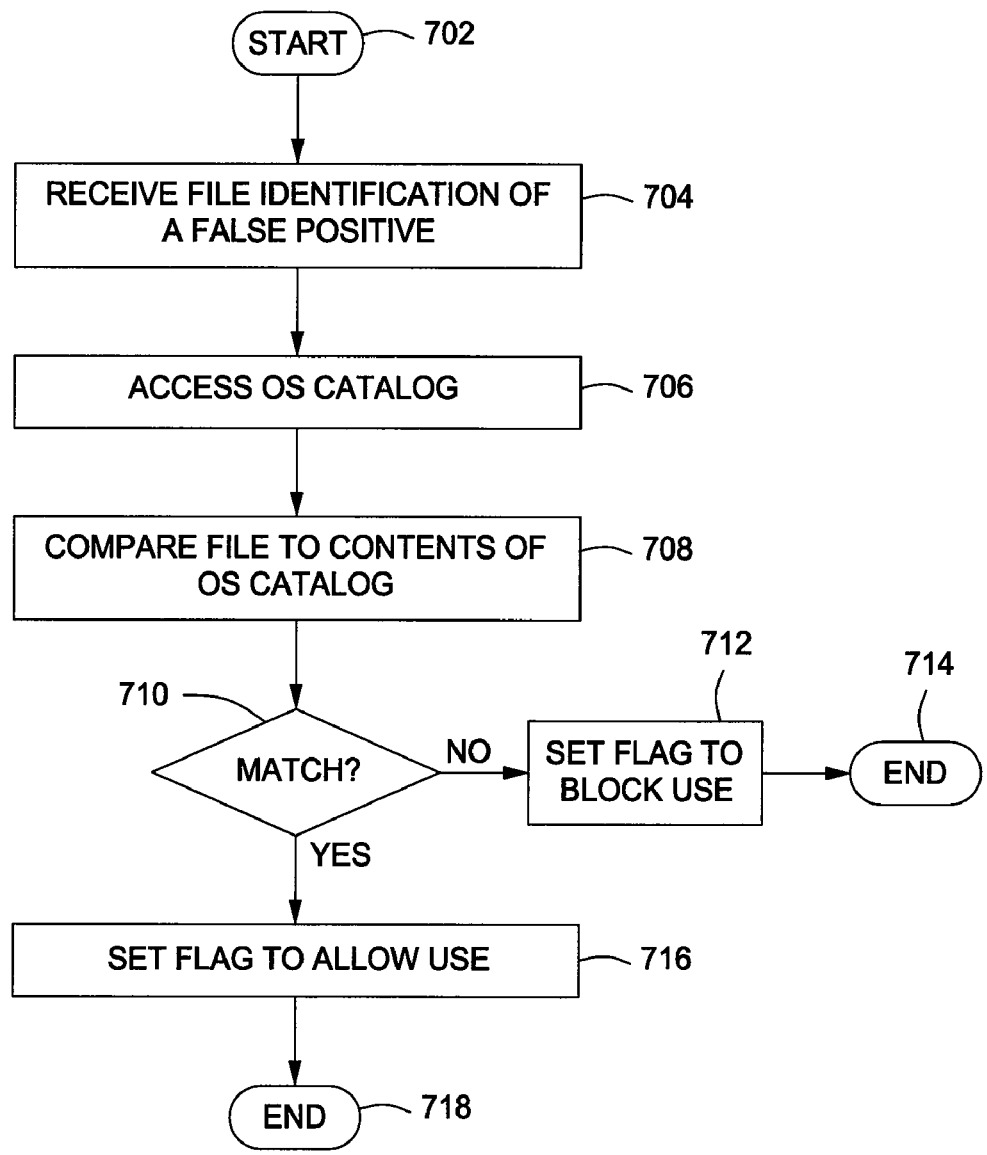
FIG. 7 depicts a flow diagram of an alternative method for mitigating false positive detections of anti-virus software in accordance with another embodiment of the invention.

FIG. 7 depicts a flow diagram of a method 700 for confirming a false positive as detected by antivirus software in accordance with an alternative embodiment of the invention. The method 700 starts at step 702 upon being notified of a malware detection in the anti-virus software. At step 704, the method 700 is notified of the file identification of the file to test for a false positive. At step 706, the method 700 accesses the operating system catalog (e.g., a .cat file in a Microsoft operating system). The catalog is generally verified as authentic and trusted using method 400.

At step 708, the method 700 compares the file to the contents of the operating system catalog. Various search and match algorithms may be used to compare the file to the catalog. At step 710, the method 700 queries whether a match has been found. If the query is negatively answered, the method 700 deems the file not to be a false positive and, at step 712, sets a flag to block use of the file. The method ends at step 714.

If the query at step 710 is affirmatively answered, the method 700 proceeds to step 716 to confirm the false positive nature of the file. At step 716, a flag is set to allow use of the file. The method ends at step 718.

As described above, embodiments of the present invention independently create a signature database comprising unique identifiers (hash entries) representing the binary contents of the operating system files. With respect to a Microsoft operating system, the operating system catalog is parsed and hashed to produce the signature database. Upon an operating system file being identified as malware, the invention produces a unique identifier (hash value) representing the binary content of the possible malware. This identifier is compared to the signature database. If the identifier is in the database, the file is deemed clean; otherwise the file is considered malware. In an alternative embodiment, the false positive is confirmed through comparing a file identified by antivirus software with the contents of an operating system catalog. If a match is found, the file is deemed a false positive.

While the foregoing is directed to embodiments of the present invention, other and further embodiments of the invention may be devised without departing from the basic scope thereof, and the scope thereof is determined by the claims that follow.

What is claimed is:

1. A method of mitigating false-positive malware detection comprising:
   accessing an operating system file that has been identified as malware;
   determining whether the operating system file has an existing digital signature;
   if there is no existing digital signature, creating a signature for the operating system file;
   comparing at least one signature attribute of the existing or created signature to at least one of a number of signature attributes contained in a signature database, wherein the at least one signature attribute of the existing or created signature comprises a name of a publisher of the operating system file; and
   if the at least one signature attribute is not found in the signature database, defining the operating system file as malware.

2. The method of claim 1 further comprising:
   analyzing files within a computer system using an anti-virus module to identify the operating system file as malware.

3. The method of claim 1 wherein the creating step further comprises:
   generating a hash value representing the operating system file.

4. The method of claim 3 wherein the hash value is at least one of an SHA-1 value or an MD5 value.

5. The method of claim 1 further comprising:
   accessing an operating system catalog;
   parsing the operating system catalog;
   reading hash values from the parsed operating system catalog to represent content of each file in the operating system; and
   storing the hash values in the signature database.

6. The method of claim 5 further comprising:
   verifying a digital signature of the operating system catalog prior to using the operating system catalog to generate the signature database.

7. The method of claim 1 further comprising:
   identifying a digital signature within the operating system file;
   extracting the digital signature from the operating system file; and
   verifying the authenticity of the digital signature.

8. The method of claim 1 further comprising:
   blocking the comparing step while the signature database is being generated.

9. A method of mitigating false-positive malware detection comprising:
   accessing an operating system catalog;
   parsing the operating system catalog;
   reading hash values from the parsed operating system catalog to represent content of files in the operating system;
   storing the hash values in a signature database;
   accessing an operating system file that has been identified as malware;
   determining whether the operating system file has an existing digital signature;
   if there is no existing digital signature, creating a signature for the operating system file;
   comparing at least one signature attribute of the existing or created signature to at least one of a number of signature attributes contained in the signature database, wherein the at least one signature attribute of the existing or created signature comprises a name of a publisher of the operating system file; and if the at least one signature attribute is not found in the signature database, defining the operating system file as malware.

10. The method of claim 9 further comprising:
analyzing files within a computer system using an antivirus module to identify the operating system file as malware.

11. The method of claim 9 wherein the creating step further comprises:
generating a hash value as the signature representing the operating system file.

12. The method of claim 11 wherein the hash value is at least one of an SHA-I value or an MD5 value.

13. The method of claim 9 further comprising:
verifying a digital signature of the operating system catalog prior to using the operating system catalog to generate the signature database.

14. The method of claim 9 further comprising:
identifying a digital signature within the operating system file;
extracting the digital signature from the operating system file; and
verifying the authenticity of the digital signature.

15. The method of claim 9 further comprising:
blocking the comparing step while the signature database is being generated.

16. A method of mitigating false-positive malware detection comprising:
accessing an operating system file that has been identified as malware;
determining a publisher of the operating system file;
comparing at least one signature attribute of the operating system file to at least one of a number of signature attributes contained in an operating system catalog; and
if the publisher of the operating system file is not found to be represented in the operating system catalog, defining the operating system file as malware.

17. The method of claim 16 further comprising verifying that the operating system catalog is authentic.

18. The method of claim 17 wherein the verifying step further comprises an authenticating digital signature within the operating system catalog.

* * * * *